United States Patent
Adimatyam et al.

(10) Patent No.: US 9,961,399 B2
(45) Date of Patent: May 1, 2018

(54) METHOD AND APPARATUS FOR ORGANIZING AND BOOKMARKING CONTENT

(75) Inventors: Venkata S. Adimatyam, Irving, TX (US); Sameer Gavade, Irving, TX (US); Enrique Ruiz Velasco Fonseca, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1302 days.

(21) Appl. No.: 12/233,656

(22) Filed: Sep. 19, 2008

(65) Prior Publication Data

US 2010/0082681 A1    Apr. 1, 2010

(51) Int. Cl.
*G06F 17/30* (2006.01)
*H04N 21/443* (2011.01)
*G11B 27/32* (2006.01)
*H04N 21/239* (2011.01)
*H04N 21/472* (2011.01)
*H04N 21/63* (2011.01)
*H04N 21/845* (2011.01)

(52) U.S. Cl.
CPC ....... *H04N 21/443* (2013.01); *G06F 17/3082* (2013.01); *G06F 17/30817* (2013.01); *G11B 27/32* (2013.01); *H04N 21/2396* (2013.01); *H04N 21/47202* (2013.01); *H04N 21/47214* (2013.01); *H04N 21/632* (2013.01); *H04N 21/8455* (2013.01)

(58) Field of Classification Search
None
See application file for complete search history.

(56) References Cited

U.S. PATENT DOCUMENTS

| | | | | |
|---|---|---|---|---|
| 1,334,525 A * | 3/1920 | Denhard | ................ | B42D 9/005 |
| | | | | 116/235 |
| 8,196,168 B1 * | 6/2012 | Bryan | .................. | G11B 27/002 |
| | | | | 725/134 |
| 2002/0069218 A1 * | 6/2002 | Sull et al. | ................... | 707/501.1 |
| 2002/0092021 A1 * | 7/2002 | Yap et al. | ........................ | 725/55 |
| 2003/0093790 A1 * | 5/2003 | Logan et al. | ................... | 725/38 |
| 2003/0229900 A1 * | 12/2003 | Reisman | ........................ | 725/87 |
| 2004/0128317 A1 * | 7/2004 | Sull | .................. | G06F 17/30849 |
| 2005/0251835 A1 * | 11/2005 | Scott, III | ........... | H04N 7/17318 |
| | | | | 725/88 |
| 2006/0064716 A1 * | 3/2006 | Sull et al. | ........................ | 725/37 |
| 2006/0161838 A1 * | 7/2006 | Nydam et al. | ................. | 715/512 |
| 2009/0193486 A1 * | 7/2009 | Patel et al. | ..................... | 725/114 |

OTHER PUBLICATIONS

Windows XP Professional Product Documentation, (c) 2011, Microsoft Corporation, http://www.microsoft.com/.*
Unknown date, latest verified is Jul. 29, 2008 (retrieved Jan. 11, 2011, daleisphere.com, http://www.daleisphere.com/wp-content/uploads/windows-xp-windows-explorer-folders-view.jpg.*

(Continued)

*Primary Examiner* — Jason G Liao

(57) ABSTRACT

An approach is provided for creating user-defined folders for organizing content accessible through a set-top box and for creating multiple bookmarks per set-top box program for use during programming playback.

23 Claims, 12 Drawing Sheets

(56) References Cited

OTHER PUBLICATIONS favfun1-2.gif, Unknown date, latest verified is Dec. 3, 2001, (retrieved Jan. 11, 2011), worldstart.com, http://www.google.com/imgres?imgurl=http://www.worldstart.com/tips/screenshots/favfun1-2.gif&imgrefurl=http://www.worldstart.com/sort-ie-favorites/&usg=_Tzd7XEN2Bc-X-ePJDI7waz949g0=&h=331&w=439&sz=17&hl=en&start=0&zoom=1&tbnid=pmei2T0CiHCwzM:&tbnh=155&t.*
Yeong et al, Lightweight Directory Access Protocol, Mar. 1995, Network Working Group, RFC 1777, http://www.ietf.org/rfc/rfc1777.txt.*
YouTube.com, verified as of Jun. 24, 2006, google.com, http://www.youtube.com/watch?v=7WmMcqp670s.*
USPTO Examiners Screenshots, taken Jun. 18, 2011 (provided as evidence of properties of WindowsXP), USPTO, WinXP Examiner Screenshots.pdf.*
Bookmark | Define Bookmark at Dictionaty.com accessed 2012, dictionary.com, http://dictionary.reference.com/browse/bookmark?s=t.*
Harbison et al, C: A reference Manual, 1995, Prentice-Hall, malloc, free.*
Matt Komorowski, A History of Storage Cost[Accessed: Jun. 28, 2012, 11:45 AM], http://www.mkomo.com/cost-per-gigabyte.*
Windows XP Professional Product Documentaiton, (C) 2011, Microsoft Corporation, http://www.microsoft.com, http://www.microsoft.com/resources/documentation/windows/xp/all/proddocs/en-us/acl_folder_permissions.mspx?mfr=true.*

* cited by examiner

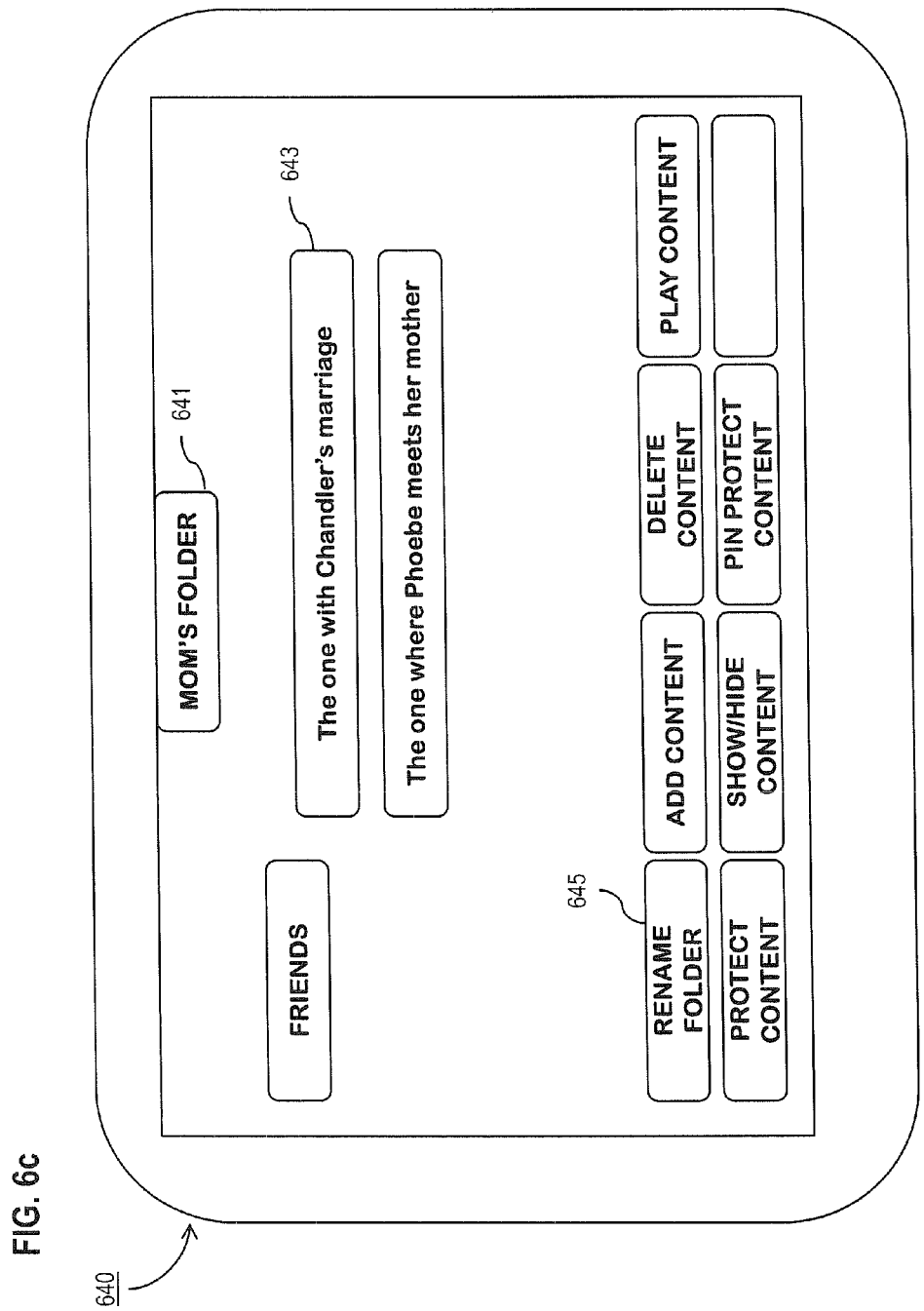

METHOD AND APPARATUS FOR ORGANIZING AND BOOKMARKING CONTENT

BACKGROUND INFORMATION

With the advent of computers, interactive electronic communications, and the Internet, as well as advances in the digital realm of consumer information, has come a reinvention of conventional entertainment and communication services to enhance programming, recording, gaming, and viewing of multimedia, such as broadcast television programs. Traditionally, broadcast media, being based on pre-computer age technology, developed on its own path, without any regard to other media systems. However, with readily available, cost-effective broadband services, bandwidth intensive applications, such as video streaming and online gaming, have become viable alternatives to legacy broadcast systems.

It is recognized that modern lifestyles have become so reliant on digital interfaces that media devices, such as set-top boxes (STBs), are developing into important iconographies of media content accessibility. As such, an increasing number of individuals are utilizing STBs to achieve the advantages of ubiquitous access to information and entertainment. The sheer volume and diversity of media content available through STBs make it challenging for even the most dedicated user to manage and track the content. In circumstances where multiple individuals share the same STB, this problem becomes exponentially more challenging.

Therefore, there is a need for an approach that provides flexible, efficient techniques to organize and bookmark content accessible through STBs.

BRIEF DESCRIPTION OF THE DRAWINGS

FIG. 6c is a diagrams of a user interface utilized in the process of FIG. 5, according to an exemplary embodiment;

DESCRIPTION OF THE PREFERRED EMBODIMENT

A preferred apparatus, method, and software for organizing set-top box content and for bookmarking the content are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
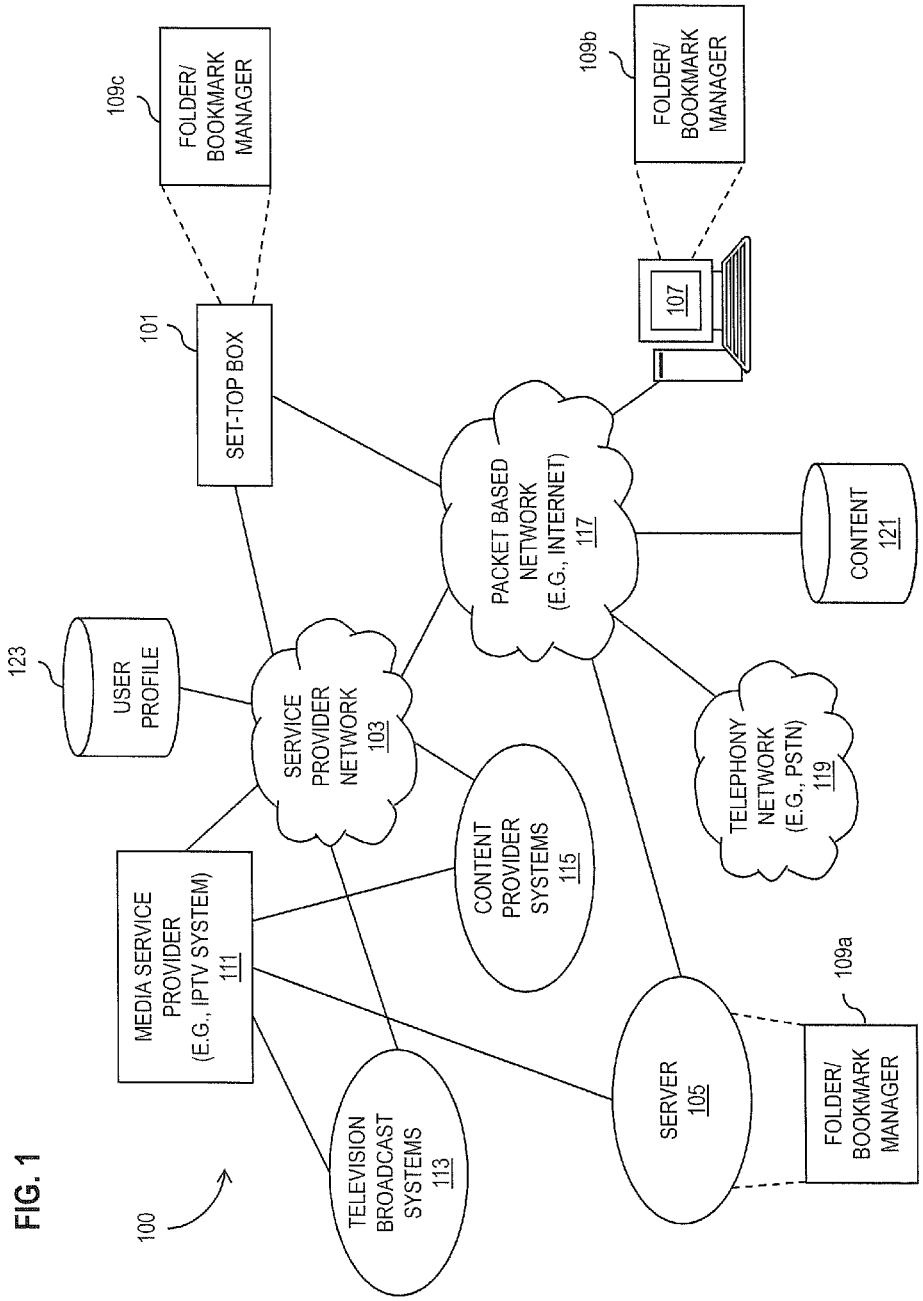
FIG. 1 is a diagram of a system capable of organizing and bookmarking set-top box content, according to an exemplary embodiment.

FIG. 1 is a diagram of a system capable of organizing and bookmarking set-top box content, according to an exemplary embodiment. For the purposes of illustration, a system 100 for using a media-based device (e.g., STB 101) to organize content (e.g., audio, video, gaming, and/or photographic media instances) into private user-created folders and to bookmark the content for easier access is described with respect to a service provider network 103. As used herein, the terms media-based device, STB, and user equipment are interchangeable.

It is recognized that service providers need to be mindful of consumer demand for increased organization of multimedia entertainment and programming accessible via a media-based device. As such, system 100 introduces content organization and bookmarking services for set-top boxes 101, thereby affording substantial convenience and flexibility in controlling the how consumers can organize the vast content library available through an STB. In other words, the content organization and bookmarking services of system 100, according to certain embodiments, stems from the need for greater flexibility in how users want to categorize and access their media content.

In traditional STB implementations (e.g., set-top boxes incorporating digital video recorders—DVRs), folder creation is implicit, which means that an STB will group two or more programs with the same title together under an automatically created folder. The STB typically names the folders using the title of the program it is grouping together. For example, a folder containing recorded episodes of "World News" would be named "World News." These types of folders are referred to as "public folders." Users can neither customize the names of public folders nor directly control what programs are grouped into the folders (e.g., users cannot group other programs within the "World News" public folder even if the programs are closely related or cover the same topic). Moreover, these same STBs provide only limited bookmarking capabilities. Current STBs permit only one bookmark per program which is created when a user stops a program. When the user subsequently stops the program at another playback location, the STB overwrites the first bookmark with the new playback position. In cases where multiple users are viewing the same program at different times, bookmarks created by earlier viewers would be lost. Thus, it is apparent that improvements are needed to provide greater control over how a user can organize and bookmark media content.

In the example of FIG. 1, service provider network 103 includes a network element (e.g., server) 105 that implements folder organization and bookmarking services, whereby users can create "private folders" that they can name and store any combination of media content. Users also have the capability to create multiple bookmarks per programming content for later use. Namely, the folder organization and bookmarking services give users control over how they can organize media (e.g., broadcast content, digital video recorder (DVR) content, on-demand content, on-demand games, and/or other suitable media, as well as locally stored instances of the same) available via a media-based device (e.g., STB 101). It is contemplated that system 100 may embody many forms and include multiple and/or alternative components and facilities.

It is observed that television remains the prevalent global medium for entertainment and information as individuals spend a great deal of time tuning into televised media. As such, television services provided over a dedicated network, such as an IPTV (internet protocol television) network, cable network, or satellite network, extend to subscribers an overwhelming choice of multimedia entertainment and programming options. For example, IPTV service providers offer consumers various AV services ranging from multi-channel AV programming that mimics traditional broadcast media, to true "on-demand" programming. These services are further supplemented with interactive AV applications that enable robust programming information, selection and navigation functionality, as well as integrated digital AV recording, and other data services to enhance the AV experience. Moreover, the increasing "richness" of network resources also enables IPTV service providers to extend interactive learning and video game applications to subscribers. As such, television is no longer a passive medium; it is an interactive entertainment encounter capable of endless configuration and personalization.

Given the breadth of content available, users are confronted with the onerous task of organizing and bookmarking programming and content so that they can easily access the content that is of interest to them. When multiple users rely on the same STB (e.g., members of a family), content invariably become intertwined making it even more difficult for any one user to find content of interest. For example, in a typical family, the father may be interested in sports programming, the mother in news programming, and the children in cartoons. Under this scenario, a conventional STB would present all of this varied content mixed together in one long list, and if the father were to accidentally select a news program the mother had previously bookmarked while browsing the list, the bookmark would be lost.

As such, consumers are demanding new and better ways to organize the content on their STBs. Thus, as previously mentioned, various embodiments of system 100 provide consumers with the tools to organize media content and bookmarks.

As seen in FIG. 1, service provider network 103 integrates the television medium with that of the telecommunications, computing, and media environments, thereby broadening the scope of devices and sources available to individuals for organizing and bookmarking content. Although the user equipment is described with respect to an STB, it is contemplated that various embodiments have applicability to any device capable of processing audio and/or video streams. The folder organization and bookmarking application (hereinafter "folder/bookmark manager") may be implemented in STB 101 via application 109c, in server 105 via application 109a, or in end terminal 107 via application 109b and apply to a variety of media content.

Content can include any AV media (e.g., gaming applications, broadcast television programs, video-on-demand (VOD) programs, audio-on-demand (AOD) programs, pay-per-view programs, IPTV feeds, DVD related content, etc.), pre-recorded media content (e.g., DVR content), data communication services content (e.g., commercials, advertisements, videos, movies, songs, images, sounds, etc.), Internet services content (streamed audio, video, or pictographic media), and/or any other equivalent media form, such as locally stored content instances of the aforementioned media. In this manner, media service provider (MSP) 111 may provide (in addition to its own media content) content obtained from sources, such as one or more television broadcast systems 113, one or more third-party content provider systems 115, content residing in a repository 121, accessible via server 105, or otherwise available via one or more packet-based networks 117 and/or telephony networks 119, as well as any other suitable avenue or source.

In particular embodiments, MSP 111 may comprise an IPTV system configured to support the transmission of television video programs from the broadcast systems 113 as well as other content, such as media content from the various third-party sources (e.g., components 101, 107, 115, 121) utilizing internet protocol (IP). That is, the IPTV system 111 may deliver signals and/or streams, including content, control commands, and/or user profile information, in the form of IP packets. Further, the transmission network (e.g., service provider network 103) may optionally support end-to-end data encryption in conjunction with the streaming and content management services, as will be explained in more detail below.

In this manner, the use of IP permits television services to be integrated with broadband Internet and gaming services, and thus, share common connections to a user site. Also, IP packets can be more readily manipulated, and therefore, provide users with greater flexibility in terms of control and personalization, as well as offer superior methods for increasing the availability of content from disparate sources. Delivery of AV content and control commands, by way of example, may be through a multicast from the IPTV system 111 to STBs 101. Any individual STB may tune to a particular source by simply joining a multicast (or unicast) of the media content or control command utilizing an IP group membership protocol (IGMP). For instance, the IGMP v2 protocol may be employed for joining STBs to new multicast (or unicast) groups. Such a manner of delivery avoids the need for expensive tuners to view media content, such as television broadcasts; however, other delivery methods, such as cable, may still be utilized. Further, this delivery method also enables varied levels of control, i.e., control over single STBs or broadcast control affecting multiple STBs. It is noted that conventional delivery methods may also be implemented and combined with the advanced methods of system 100. Further, the content (and subsequently the control commands folder organization and bookmarking) may be provided to various IP-enabled devices, such as various computing, telephony, and mobile apparatuses delineated below.

An STB (e.g., STB 101) may integrate all the functions of an IPTV system, as well as combine the content organization and bookmarking functions of the various online or off-line environments, in a manner that seamlessly toggles among the various system 100 resources. It is contemplated that the remote service may be extended to users with a presence on the Internet. In alternative embodiments, the services of system 100 may be extended to users having an end terminal (not illustrated), such as a plain old telephone service (POTS) device, connected to the telephony network 119.

Accordingly, MSP 111 can provide content that is retrieved over a data network, as well as provide conventional media streams. For instance, MSP 111 provides STBs 101 access to content traditionally limited to host sites, such as end user originated content uploaded to audio, video, and/or pictographic sharing sites. The content may also be shared between multiple STBs, as well as between STBs and end terminal(s) 107. It is generally noted that media content can be any type of information provided from any source having connectivity to system 100.

In this manner, folder/bookmark managers 109b and 109c may be executable, for example, as a user interface capable of local implementation on an STB (e.g., STB 101) or on an end terminal 107, such as a computer, telephony device, mobile device, or other like mechanism. Thus, exemplary embodiments of folder/bookmark managers 109b and 109c may be provided through navigation shell applications, e.g., menu applications having options corresponding to different functions, as well as various content instances and/or multimedia experiences. To this effect, computing devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data and/or processing audio/video signals. Moreover, STB 101 may be used alone or in combination with one or more end terminal(s) 107 to implement various exemplary embodiments.

STB 101 and/or end terminal(s) 107 can communicate using the packet-based network 117 or the telephony network 119. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS® network, a TiVo® network, etc), and the like. Such networks may also utilize any suitable protocol supportive of data communications, e.g., transmission control protocols (TCP), internet protocols (IP), user datagram protocols (UDP), hypertext markup languages (HTML), dynamic HTML (DHTML), file transfer protocols (FTP), telnet, hypertext transfer protocols (HTTP), asynchronous transfer mode (ATM), wireless application protocols (WAP), socket connections (e.g., secure sockets layer (SSL)), Ethernet, frame relay, and the like, to connect STBs 101a-101n to various sources of media content and devices capable of remotely managing STBs 101a-101n.

By way of example, STB 101, as well as terminal(s) 107, can remotely access, via a communication interface (not illustrated), server 105 which can be configured to execute multiple instances of a folder/bookmark manager application 109a utilizing, for instance, one or more processors (not illustrated). That is, remote application 109a may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 105 can be an "online" system capable of communicating with one or more third-party web servers (not illustrated), content repositories (e.g., repository 121), or equivalent facilities, to provide users various avenues to draw content from and make available to STB 101. More specifically, one or more servers 105 may include one or more processors configured to receive user input from one or more end terminals 107 (and/or STBs) for organizing and bookmarking content available one or more STBs 101 (and/or end terminal(s) 107), wherein the server(s), via the processor(s), are capable of configuring user-defined folders and bookmarks according to the user input. In particular embodiments, this configuration can be performed in real-time, wherein the user input is transmitted to STBs to directly affect folder organization and bookmarking data stored in a memory (not illustrated) of the respective media-based device 101. Additionally (or alternatively), server(s) 105 can access a shared memory, such as repository 123, wherein STB 101 obtains sufficient configuration data from the shared memory, either in real-time or on a periodic basis.

As such, exemplary embodiments of remote application 109a may, for instance, comprise hypertext markup language (HTML) user interfaces or JAVA™ applets stored on server 105 and accessed via world-wide-web pages. Further, by enabling access and control of STB 101 over one or more data networks (e.g., network 103, 117, and/or 119) using a "web paradigm," server 105 provides users with a convenient and efficient manner for organizing and bookmarking content made available to the media-based devices 101a101n. Further, remote applications 109a-109c may port local user interfaces typically utilized on stand-alone STBs to enable user input in a context consumers are increasing becoming familiar with due to the growing popularity of the Internet. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing. In alternative embodiments, server 105 is collocated with and/or integrated into MSP 111. As such, multiple users, interfaces, and instances of folder/bookmark manager 109a can be simultaneously realized through system 100.

In one embodiment, STB(s) 101, end terminal(s) 107, and/or folder/bookmark managers 109a-109c may periodically establish a connection with one or more networks (e.g., networks 103, 117, and/or 119) and one or more repositories (e.g., repository 123) to "push" and "pull" content and/or control commands, such as in a "batched" processing mode. That is, a user interface of STB 101 may be virtualized over a networked connection. In another embodiment, these components may initiate peer-to-peer communications such that control input and configuration updates governing folder organization and bookmarking are executed "on-the-fly," i.e., in real-time, thus, enabling substantially instantaneous results.

In an exemplary embodiment, STBs 101a-101n can draw, receive, and/or transmit content, folder organization, bookmarking, and/or control commands from (or to) multiple sources/sinks, thereby alleviating the burden on any single entity, e.g., MSP 111, to meet the content and control demands of any user, premise, or workgroup. Thus, particular embodiments enable authenticated third-party television broadcast systems 113, third-party content provider systems 115, and servers (e.g., server 105) to transmit content and/or control commands to STB 101 either apart from, or in conjunction with, MSP 111. The content, folder organization, bookmarking information, and/or the control commands may be distinguished (or otherwise categorized) utilizing metadata included therewith or appended thereto. Metadata can be generally considered data about data; but more specifically, it can be utilized to describe all aspects of, and media content, user profile information, and/or control commands distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, regions, etc.), locations of supplementary information and processes, access methods, limitations, timing of activities/events/content availability (e.g., start/end times and dates), as well as motivations, policies and rules. As such, metadata may be utilized by various components of system 100 for control or guiding purposes.

In various embodiments, the service provider network 103 may include one or more video, audio, communication, and/or control command processing modules (not shown) for acquiring, generating, presenting, and/or transmitting content feeds, folder organization, bookmarking information, and/or control commands from MSP 111, the television broadcast systems 113, the third-party content provider systems 115, servers 105, end terminals 107, or STBs 101a-101n, over one or more of the networks 103, 117, 119, to particular users at various STBs 101a-101n and/or end terminal(s) 107. Further, service provider network 101 can optionally support end-to-end data encryption in conjunction with media content streaming and remote access services such that only authorized users are able to experience customized content, establish one or more user profiles specifying content available to secondary users, and/or interact with other legitimate users/components of system 100.

Accordingly, system 100 may include an authentication module (not shown) configured to perform authentication services and determine whether users are indeed subscribers to the content management service. An authentication schema may require a user name and password, a key access number, a unique machine identifier (e.g., media access control (MAC) address, globally unique identifier (GUID), serial number), etc., as well as combinations thereof. In this manner, the authenticate module may be in communication with a user profile repository 123, which stores user credentials and personalized information for use by folder/bookmark managers 109a-109c. In particular embodiments, media-based devices 101 and/or end terminal(s) 107 are provisioned for system 100 by associating a device identifier of the respective devices with respect subscriber accounts, where the accounts identify each of the media-based devices 101 and/or end terminal(s) 107.

In exemplary embodiments, a one time only provisioning authentication procedure is executed for each STB 101 and/or end terminal(s) 107 by transmitting an associated machine identifier and user credentials to the authentication module. Thus, once a subscriber has authenticated a presence on system 100, the user may bypass additional authentication procedures for executing later applications (e.g., content streaming instances and/or folder/bookmark manager sessions). Data packets, such as cookies, may be utilized for this purpose. Thus, once an STB or content source is authenticated, connections between the STBs 101 and the end terminal(s) 107 may be established directly or through server 105 and/or MSP 111.

While system 100 is illustrated in FIG. 1, the components are exemplary in nature, and indeed, additional or alternative components and/or implementations may be utilized.

Figure 2:
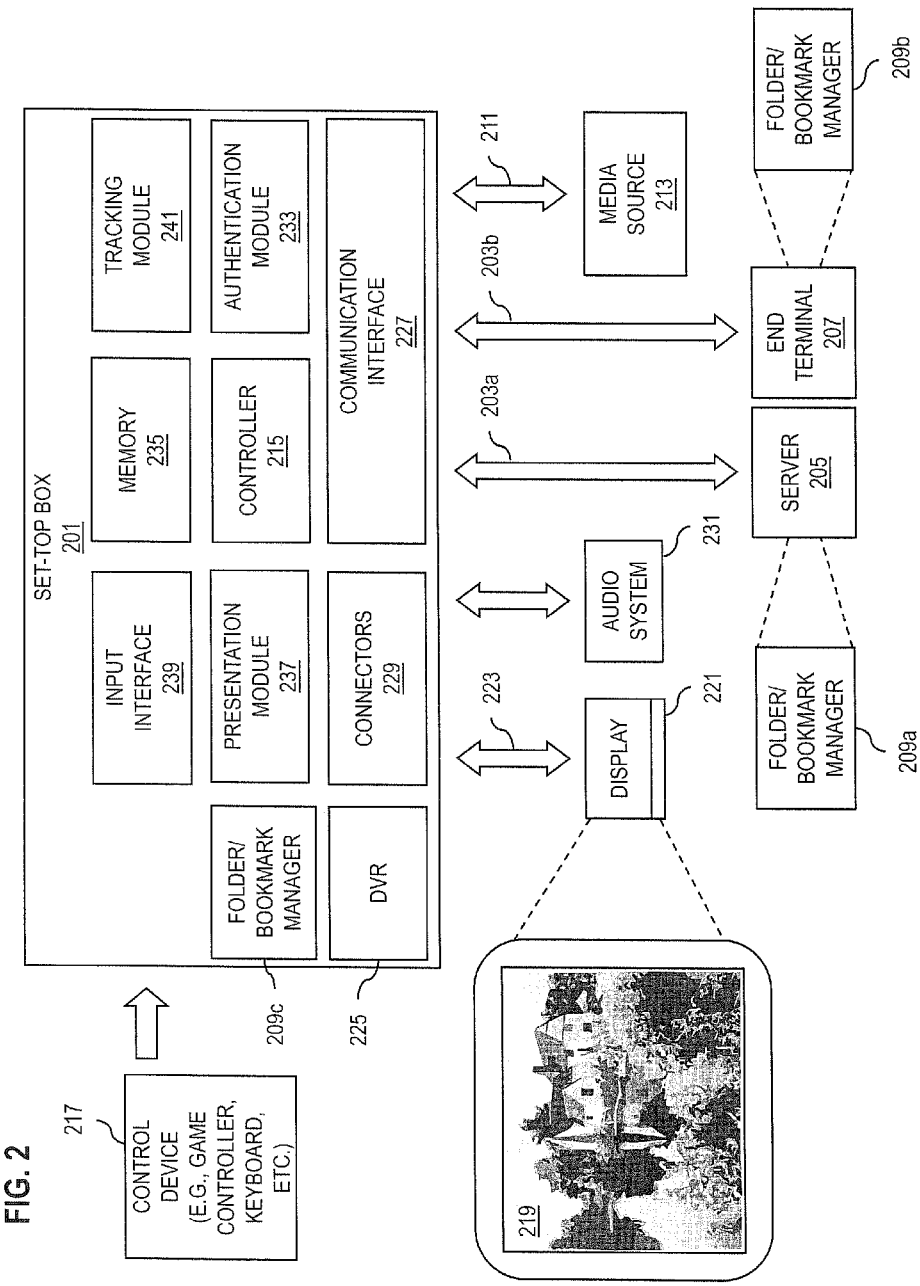
FIG. 2 is a diagram of a set-top box configured to operate in the system of FIG. 1, according to an exemplary embodiment.

FIG. 2 is a diagram of a set-top box configured to operate in the system of FIG. 1, according to an exemplary embodiment. STB 201 may comprise any suitable technology to create user-defined folders for organizing media content and create multiple bookmarks for set-top box content. STB 201 may further comprise suitable technology to receive one or more content streams 211 from a media source 213, such as the IPTV system of FIG. 1. The content stream 211 may include media, such as broadcast content, digital video recorder (DVR) content, on-demand content, on-demand games, and/or other suitable media, as well as locally stored instances of the same.

Accordingly STB 201 may comprise computing hardware (such as described with respect to FIG. 10) and include additional components configured to provide specialized services related to the generation, transmission, reception, and display of user-defined folders and bookmarks control commands, and/or content (e.g., user profile capabilities, conditional access functions, tuning functions, presentation functions, multiple network interfaces, AV signal ports, etc.). Alternatively, the functions and operations of STB 201 may be governed by a controller 215 that interacts with each of the STB components to configure user profiles in response to control commands from folder/bookmark managers 209a-209c, as well as provide media content retrieved from media source 213. Additionally, a user may be afforded greater functionality utilizing a control device 217 to control these services, as will be more fully described below.

As such, STB 201 may be configured to process data streams (e.g., streams 203a, 203b, and 211), including causing a folder/bookmark manager 209c and/or one or more components of received content (e.g., video component 219 and/or an audio component) to be presented on (or at) a display 221. Presentation of the content may be in response to a command received from one or more folder/bookmark managers 209a-209c and include: displaying, recording, playing, rewinding, forwarding, toggling, selecting, zooming, or any other processing technique that enables users to select customized content instances from a menu of options and/or experience content. For instance, STB 201 may provide one or more signals 223 to a display 221 (e.g., television) so that the display 223 may present (e.g., display) information created by the folder/bookmark manager 209c overlaid on the content (e.g., video 219) to a user, wherein the folder/bookmark manager 209c enables a user to create private user-defined folders for storing content and creating multiple bookmarks. Alternatively, signals 223 may be configured and provided to display 221 in response to a received control command from a folder/bookmark manager 209a or 209b.

STB 201 may also include a PVR, such as digital video recorder (DVR) 225, to store received content that can be manipulated by a user at a later point in time. In various embodiments, DVR 225 may be network-based, e.g., included as a part of the service provider network 103, collocated at a subscriber site having connectivity to STB 201, and/or integrated into STB 201. In any case, folder/bookmark managers 209a-209c may directly interact with content stored on DVR 225. A display 221 may present content provided via STB 201 to a user. In alternative embodiments, STB 201 may be configured to communicate with a number of additional peripheral devices, including: PCs, laptops, PDAs, cellular phones, monitors, mobile devices, handheld devices, as well as any other equivalent technology capable of organizing and and/or bookmarking content for a user, such as those computing, telephony, and mobile apparatuses described with respect to FIG. 1.

According to various embodiments, STB 201 may also include inputs/outputs (e.g., connectors 229) to display 221 and an audio system 231. In particular, audio system 231 may comprise a conventional AV receiver capable of monaural or stereo sound, as well as multichannel surround sound. Audio system 231 may include speakers, ear buds, headphones, or any other suitable component configured for personal or public dissemination. As such, STB 201, display 221, DVR 225, and audio system 231, for example, may support high resolution audio and/or video streams, such as high definition television (HDTV) or digital theater systems high definition (DTS-HD) audio. Thus, STB 201 may be configured to encapsulate data into a proper format with required credentials before transmitting onto one or more of the networks of FIG. 1, and de-encapsulate incoming traffic to dispatch data to display 221 and/or audio system 231.

In an exemplary embodiment, display 221 and/or audio system 231 may be configured with internet protocol (IP) capability (i.e., include an IP stack, or otherwise made network addressable), such that the functions of STB 201 may be assumed by display 221 and/or audio system 231 and controlled, in part, by folder/bookmark manager command(s). In this manner, an IP ready, HDTV display or DTS-HD audio system may be directly connected to one or more service provider networks 103, packet-based networks 117, and/or telephony networks 119. Although STB 201, display 221, and audio system 231 are shown separately, it is contemplated that these components may be integrated into a single component, or other combination of components.

An authentication module 233 may be provided at STB 201 to initiate or respond to authentication schemes of, for instance, service provider network 103 or various other content providers, e.g., broadcast television systems 113, third-party content provider systems 115, or servers 105. Authentication module 233 may provide sufficient authentication information, e.g., a user name and password, a key access number, a unique machine identifier (e.g., GUID or MAC address), and the like, as well as combinations thereof, to a corresponding network interface for establishing connectivity. Authentication information (as well as user profile information) may be stored locally at memory 235, in a repository (not shown) connected to STB 201, or at a remote repository, e.g., user profile repository 123.

A presentation module 237 may be configured to receive data streams 203a, 203b, and-211 (e.g., AV feed(s) and/or control commands) and output a result via one or more connectors 229 to display 221 and/or audio system 231. In this manner, presentation module 237 may also provide a user interface for folder/bookmark manager 209a or 209c via display 221. Aural aspects of content managers 209a or 209c may be presented via audio system 231 and/or display 221. In certain embodiments, information or screens associated with the folder/bookmark managers 209a or 209c may be overlaid on the video content output 219 of display 221 via presentation module 237. In any case, however, the data streams may include broadcast content, digital video recorder (DVR) content, on-demand content, on-demand games, and/or other suitable media, as well as locally stored instances of the same.

Connector(s) 229 may provide various physical interfaces to display 221, audio system 231, as well as other peripherals; the physical interfaces may include, for example, RJ45, RJ11, high definition multimedia interface (HDMI), optical, coax, FireWire, wireless, and universal serial bus (USB), or any other suitable connector. The presentation module 237 may also interact with a control device 217 for configuring the folder/bookmark manager 209a-c, as well as determining particular content instances that a user desires to experience. In an exemplary embodiment, the control device 217 may comprise a game controller, a keyboard, and/or a remote control (or other access device having control capability, such as end terminal 207, e.g., a PC, wireless device, mobile phone, etc.) that provides a user with the ability to readily manipulate and dynamically change parameters affecting user-created folders, bookmarks, and/or other multimedia experiences (e.g., playing an on-demand game). Such parameters can include STB 201 configuration data, such as PINs, parental controls, available channel information, favorite channels, program recording settings, viewing history, or loaded software, as well as other suitable parameters.

In particular embodiments, configuration data may also include channel fixing options, sbow/hide/label channel functions, making captions or info banners available, label inputs (such as connector(s) 229) options, application graphics settings (e.g., color schemes, icons, etc.), high altitude settings, power saving modes, device password options, country/language options, display settings (e.g., AV parameters), control functions (e.g., channel up/down. input, mute, pause, picture-in-picture, play, power on/off, rewind, fast-forward, record, stop, volume up/down), parental locks, application settings (e.g., memory sticks, i.links, clocks/timers, diagnostics, cable card), change operating system functions, or install software, as well as provide troubleshooting frequently asked questions, get device manuals, or receive safety tips, etc. It is generally noted that configuration data can be any option/feature available at STB 201, or peripheral device (e.g., display 221, audio system 231, control device 217, etc.) having connectivity to (or association with) STB 201.

In this manner, control device 217 and/or end terminal 207 may include (not shown) a cursor controller, trackball, touch screen, touch pad, keyboard, and/or a key pad for activating folder/bookmark managers 209a-209c, navigating through broadcast channels and/or content, as well as establishing user-created folders and bookmarks and performing other processes as described herein. For instance, control device 217 or end terminal 207 may be utilized to maximize a folder/bookmark manager, navigate through displayable interfaces including selectable content associated with particular private folder, select desired content bookmarks, locate/specify/retrieve content, adjust STB 201 configuration data, or toggle through available broadcast channels and/or content. Control device 217 or end terminal 207 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like. In other examples, STB 201 may be configured for voice recognition such that STB 201 may be controlled with spoken utterances entered into a folder/bookmark manager (e.g., folder/bookmark manager 209c).

Further, the control device 217 or end terminal 207 may comprise a memory (not illustrated) for storing preferences and data determining user-created private folders and bookmarks, which can be conveyed to STB 201 through an input interface 239 (or communication interface 227). Input interface 239 may support any type of wired and/or wireless link, e.g., infrared, radio frequency (RF), BLUETOOTH, and the like. Thus, control device 217 and/or end terminal 207 may store user preferences with respect to managed content, such as favorite sources, etc., as well as user-created private folder and bookmark information. Alternatively, user-created private folder and bookmark information may be tracked, recorded, or stored in STB 201, via memory 235, or in a network user profile repository 123. A tracking module 241 may be provided for this purpose, as well as monitoring content usage statistics (e.g., date and time spent experiencing particular content instances) for effecting scheduling information and associated content availability parameters associated therewith. It is noted that control device 217 may be separate from STB 201 or may be integrated within STB 201 (in which case certain input interface hardware and/or software may not be necessary). 100531 STB 201 may include one or more user interfaces configured to allow subscribers to organize their STB content into user-created private folders and create bookmarks for STB content. As such, a menu of customized content organization and bookmarking options (e.g., create folder, rename folder, add content) may be presented to a user via folder/bookmark managers 209a-209c. It is recognized; however, that one or more user interfaces may be implemented at one or more end terminals 207 or accessible via one or more servers 205 or MSPs 111.

Figure 3:
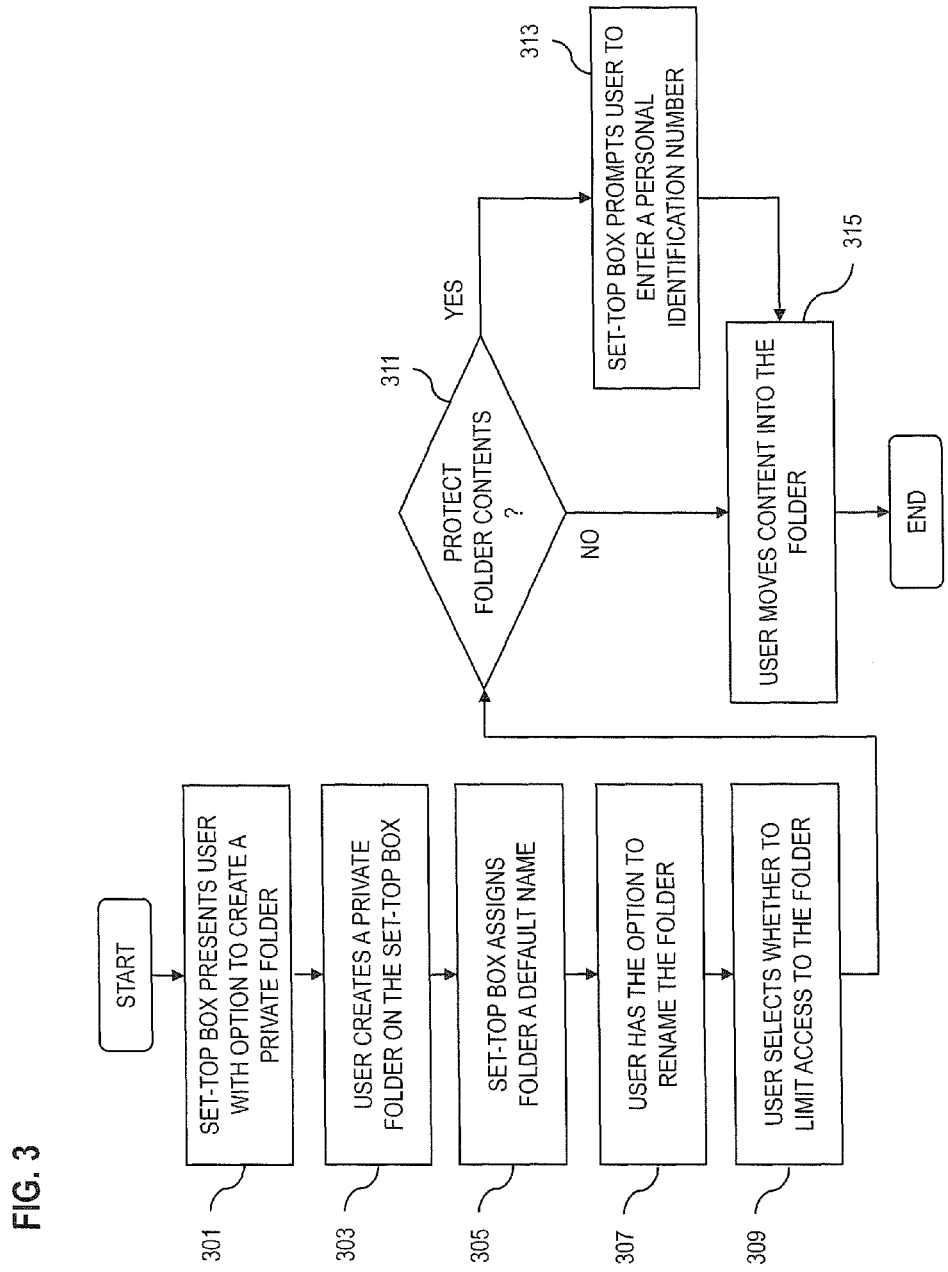
FIG. 3 is a flowchart of a process for creating private folders for organizing set-top box content, according to an exemplary embodiment.

FIG. 3 is a flowchart of a process for creating private folders for organizing set-top box content, according to an exemplary embodiment. As discussed above, traditional STBs do not allow users to create their own folders for organizing content. Instead, STBs automatically create public folders that group programs by name and do not allow users to move content among the public folders. This shortcoming limits the options the user has to organize an increasing content library available through an STB in ways that are meaningful to the user.

The exemplary embodiment addresses this shortcoming by enabling a user to create private folders for organizing STB content. Further, the user can name the folder, establish access limits, and move any combination of content into any folder. In one embodiment, there are no limitations on the number of private folders a user can create. Creation of private folders is especially helpful in scenarios where multiple users (e.g., a family) share the same STB 201. In this example, the father can create his own folder, "DAD's FOLDER," to store his favorite content; the mother can create here own folder, "MOM'S FOLDER," to store her favorite content; and so on with each subsequent family member.

The process as described in FIG. 3 begins from the point where the user has already accessed the content display screen of the STB 201. In step 301, the STB's folder/bookmark manager 209c displays menu options for creating a private folder. In the exemplary embodiment, the user may interact with the input interface using a control device (e.g., control device 217), which is capable of transmitting control commands associated with the folder/bookmark manager 209c. For example, the user may select a dedicated "MENU" button or equivalent on control device 217 to access the folder creation menu. It is recognized that any other suitable actuator of these devices may be additionally, or alternatively, used to access the functionality of interface 400, such as triggering a "GUIDE" icon or other suitable graphical element. In other embodiments, a user may interact with the folder/bookmark manager 209b using, for instance, an end terminal 207, which is capable of processing and transmitting folder/bookmark data and control commands over a network (e.g., packet-based network 117). That is, the user may interact with an input interface of end terminal 207 to activate software resident on the device, such as the folder/bookmark manager 209b executed on end terminal 207 or, alternatively, web-based folder/bookmark manager 209a implemented on server 205.

In step 303, the user initiates the option to create a private folder by navigating to and selecting the "CREATE FOLDER" menu option via the control device 217 or on a peripheral device communicatively coupled thereto (or associated therewith), such as end terminal 207. Other embodiments may depict the "CREATE FOLDER" menu option in an alternative graphical representation such as an icon. Upon selection of the option, the folder/bookmark manager 209c creates the folder and stores the folder data locally in the STB's onboard memory. In certain embodiments, folder information may be stored on the server 205 or user profile store 123 linked to the STB via a communications network (e.g., packet-based network 117 or telephony network 119).

By default, the folder/bookmark manager 209c creates a private folder with the name "PRIVATE 1" per step 305. If a private folder already exists with the default name, the folder/bookmark manager 209c will sequentially increase the numbering in the default name. For example, if "PRIVATE 1" already exists, the folder/bookmark manager 209c will name the next private folder "PRIVATE 2."

After the folder/bookmark manager 209c creates the private folder with the default name, the folder/bookmark manager 209c will present the user with the option to rename the folder per step 307. If the user elects to rename the folder, the folder/bookmark manager 209c will present a folder name input screen to the user. The user may input the name via the control device 217 or other equivalent connected peripheral. If the user elects not to change the default folder name at this time, the user may still do so at any time using the process discussed with respect to FIG. 5 below.

In the next step 309 of folder creation, the folder/bookmark manager 209c will present the user with a screen asking whether the user would like to limit access to the contents of the folder per step 311. If the user responds in the affirmative, the folder/bookmark manager 209c will present a screen requesting that the user create a four-digit personal identification number (PIN) as depicted in step 313. It is contemplated that other embodiments may use other forms of identity challenges to limit access to folder contents such as alphanumeric passwords, biometric security, voice recognition, and/or face recognition. If the user elects not to limits access to the contents of the folder at the time of folder creation, the user may still do so at any time using the process discussed with respect to FIG. 5 below. It is noted that even if the user does not specifically limit access to content in the private folder, the STB's global parental control and ratings settings will still govern access to the content. For example, if the user set the STB's parental control settings to protect all content having a certain rating with a PIN, the STB 201 will still require that the user enter the parental control PIN before granting access to the content. The process for limiting access to STB folders is described in more detail with respect to FIG. 4 below. After determining whether to protect the contents of the folder, the folder creation process is complete, and the user may begin adding content the folder per step 315. The process for adding content to a folder is described in more detail with respect to FIG. 5 below.

Figure 4:
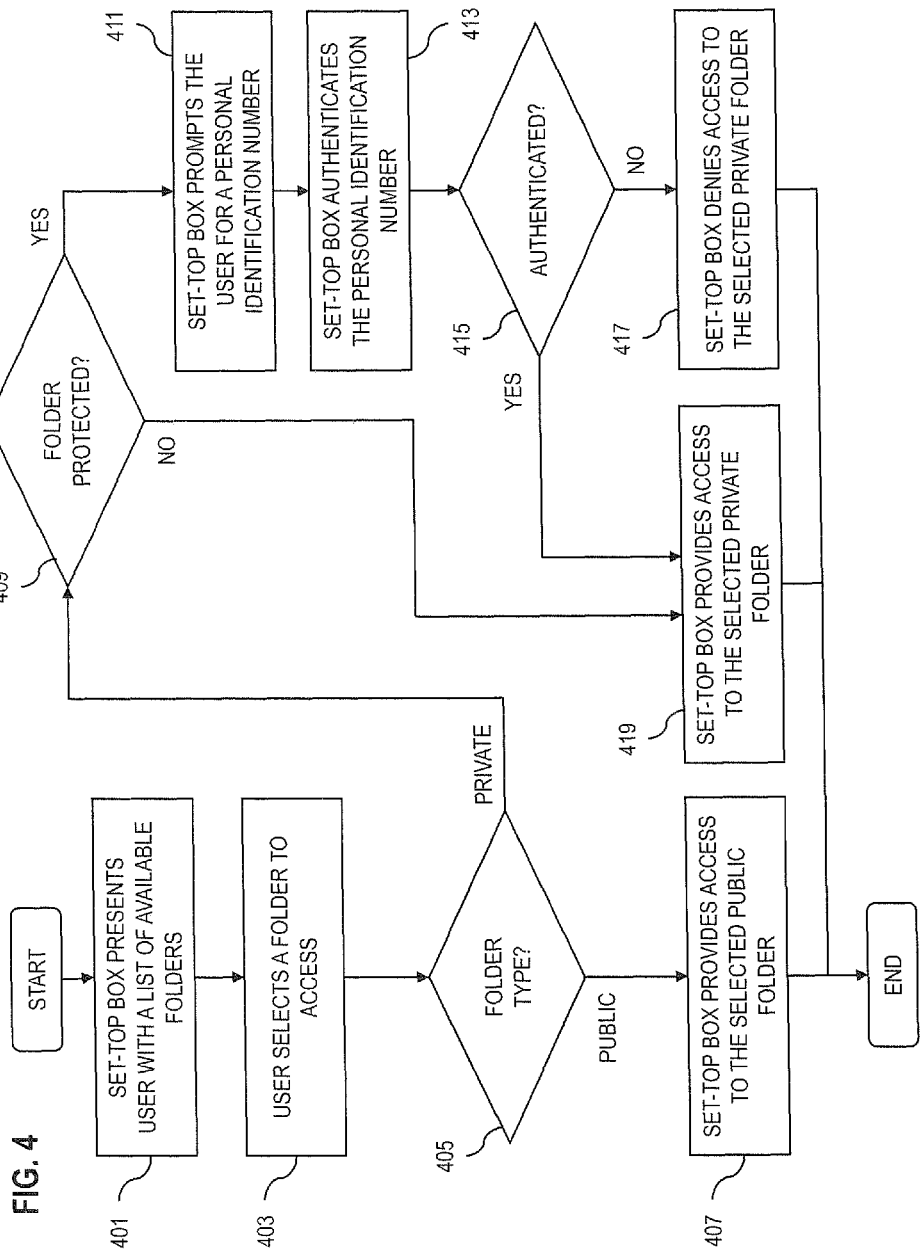
FIG. 4 is a flowchart of a process for providing access to content organized in public and private folders on a set-top box, according to an exemplary embodiment.
Figure 6A:
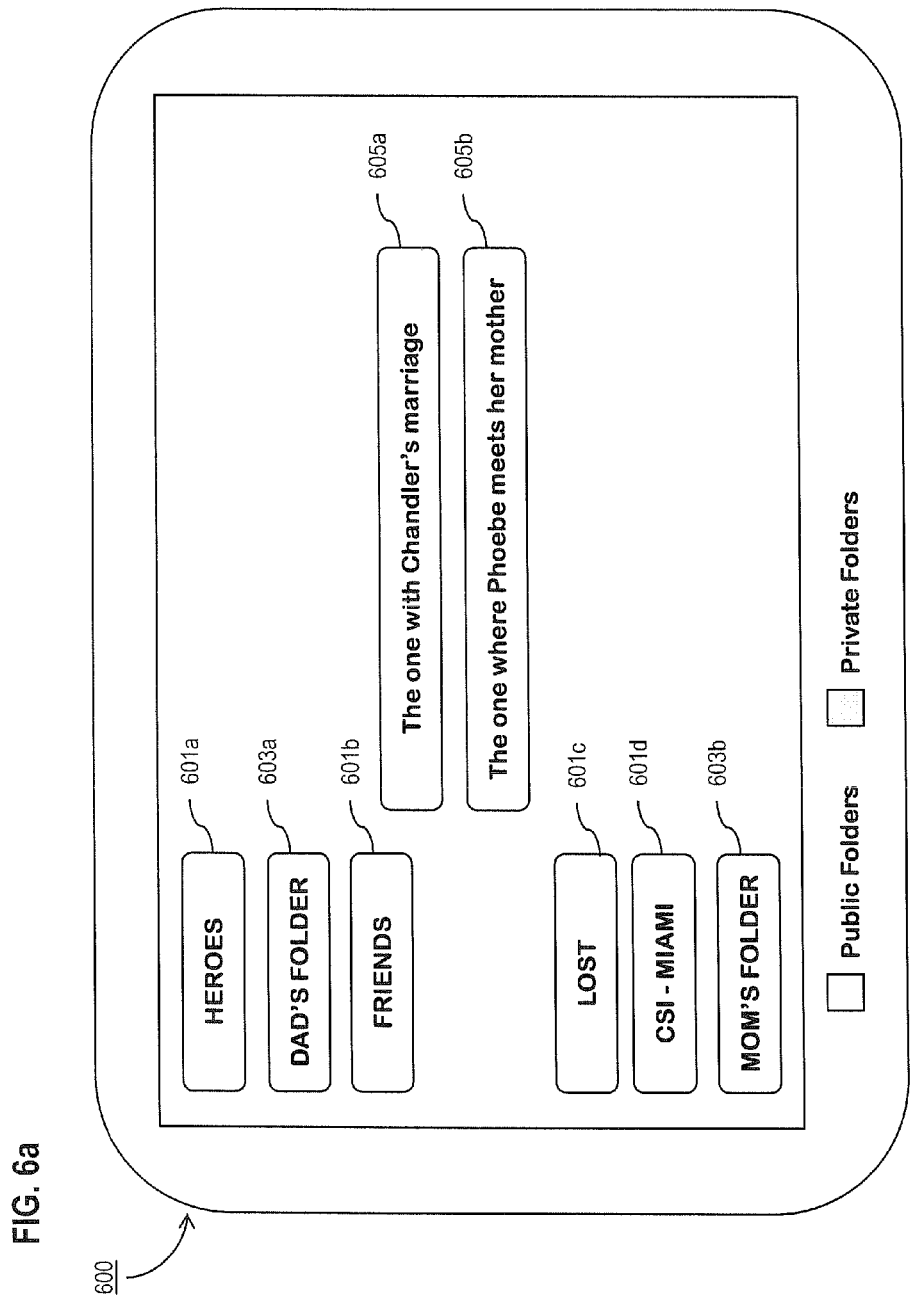
FIGS. 6a-6b are diagrams of user interfaces utilized in the process of FIG. 4, according to an exemplary embodiment.

FIG. 4 is a flowchart of a process for providing access to content organized in public and private folders on a set-top box, according to an exemplary embodiment. This process is described with respect to exemplary user interfaces of FIGS. 6a-6b. In step 401, the STB 201 presents the user with a list of all available folders, both public and private. FIG. 6a depicts an exemplary user interface screen for listing STB folders. User interface 600 of FIG. 6a illustrates a user interface screen listing STB public folders 601a-601d and private folders 603a-603b. In one embodiment, private folders are differentiated from public folders using different colors to help the user to quickly and easily distinguish the different types of folders; alternatively, other indicia can be utilized to distinguish public and private folders. It is contemplated that other means to differentiate the folder types may be used (e.g., using different icons, using different fonts, and listing the two folder types in different sections of the screen). The user interface depicted in FIG. 6a also enables the user to quickly show or hide programming content within each folder. For example, the user may select folder 601b, "FRIENDS," and display the individual episodes 605a-605b stored in the folder. Selecting the option again will hide the list of individual episodes.

From the list of available folders, the user may select a folder to access per step 403. Once the user makes his or her selection, the folder/bookmark manager 209c determines whether the requested folder is public or private in step 405. If the folder is public, the folder/bookmark manager 209c provides access to the contents of the public folder subject to any parental controls enabled on the STB 201 per step 407. Full access to the contents of a public folder allows the user to view the content, delete the content, and/or protect the content from deletion.

Figure 6B:
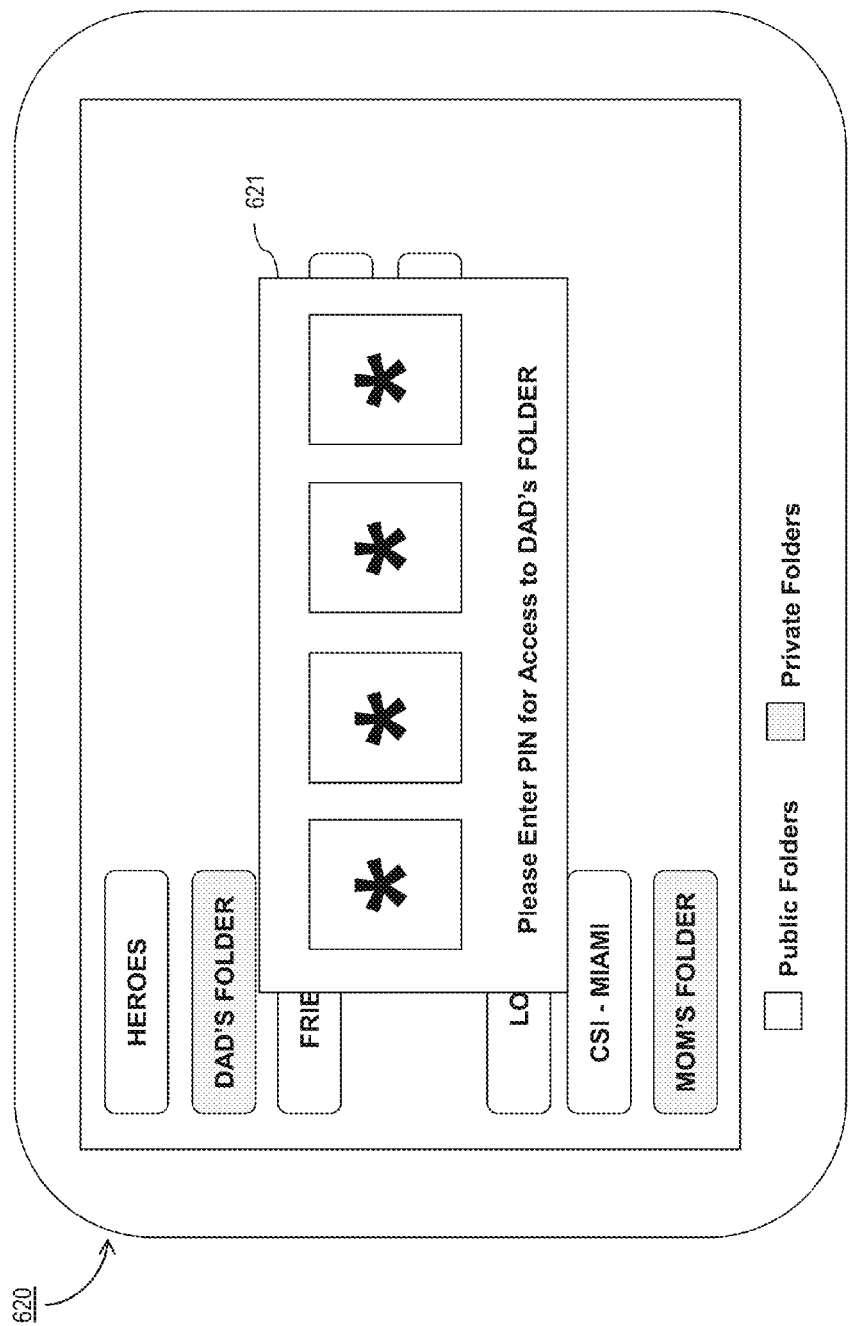

If the folder is private, the folder/bookmark manager 209c determines whether the folder's creator has protected the folder with a PIN per step 409. If the folder is not PIN-protected, the folder/bookmark manager 209c provides access to the selected private folder. If the folder is PIN protected, the STB 201 prompts the user for a PIN per step 41 1. FIG. 6b depicts a PIN challenge screen 620. To gain access to the private folder, the user must enter a four-digit PIN through dialog 621 of FIG. 6b. In steps 413 and 415, the folder/bookmark manager 209c authenticates the user's PIN input. If the folder/bookmark manager 209c cannot authenticate the PIN by matching it against the PIN specified during folder creation, the folder/bookmark manager 209c denies access to the private folder per step 417. If the PIN is authenticated, the folder/bookmark manager 209c provides access to the selected private folder, per step 419. The user can then perform the private folder functions, as described below.

Figure 5:
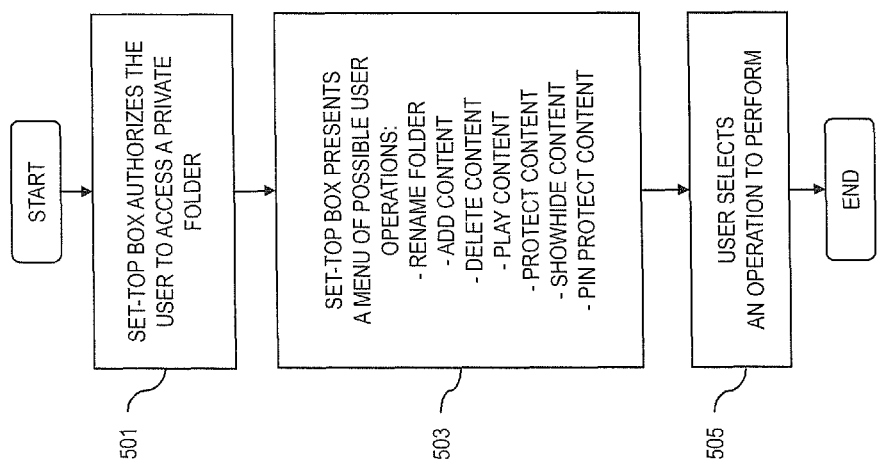
FIG. 5 is a flowchart of a process for presenting a menu of options available when accessing a private folder to organize content on a set-top box, according to an exemplary embodiment.

FIG. 5 is a flowchart of a process for presenting a menu of options available when accessing a private folder to organize content on a set-top box, according to an exemplary embodiment. This process is described with respect to the exemplary user interface of FIG. 6c. Following the authentication process described with respect to FIG. 4 above, the folder/bookmark manager 209c grants the user access to the selected private folder, per step 501. In step 503, the folder/bookmark manager 209c presents a menu of options available to the authenticated user for maintaining a private folder and its contents. These menu options include: "RENAME FOLDER", "ADD CONTENT", "DELETE CONTENT", "PLAY CONTENT", "PROTECT CONTENT", "SIOW/HIDE CONTENT", and "PIN PROTECT CONTENT." "RENAME FOLDER" enables a user to change the name of a private folder. The user may select this function to change the name of a folder that still has its default name or to change the name of a previously named folder. The folder/bookmark manager 209c does not allow the user to change the name of the folder to a name that is already in use. The "ADD CONTENT" option permits the user to move content from other folders (public or private) to the currently selected private folder. When the user selects the option to "ADD CONTENT", the currently selected private folder remains highlighted. The user can then navigate to any other content item available to the STB 201. Once the user reaches the content item he or she wants to copy to the private folder, the user selects the item. The STB 201 then moves the item to the selected folder. "DELETE CONTENT" enables the user to delete either all or individual content items in the folder. The "PLAY CONTENT" option provides play back of content in the folder. If the user selects "PLAY ALL," the STB 201 will play back all content in the folder sequentially. The user also can select individual content items to play back. "PROTECT CONTENT" protects items in the folder from deletion. The user may choose to protect all items or individual items. The user also may select to unprotect items. This option, in one embodiment, provides protection against deletion not against access which is discussed in the "PIN PROTECT CONTENT" option below.

With the "SHOW/HIDE CONTENT" option, the user can toggle between displaying and hiding the individual items in the folder. The "PIN PROTECT CONTENT" option enables the user to limit access to the folder and its contents by requiring a PIN (or other passcode) to gain access. This menu option acts as a toggle. If the currently selected folder is not already PIN protected, the folder/bookmark manager 209c prompts the user to enter a new PIN that is required for subsequent access to the folder. If the currently selected folder is already PIN protected, the folder/bookmark manager 209c presents the user with the additional options of changing the PIN or removing the PIN. If the user selects the option to change the PIN, the folder/bookmark manager 209c verifies the current PIN and then allows the user to specify a new PIN for subsequent access. If the user selects the option to remove the PIN, the folder/bookmark manager 209c with verify the current PIN and then removes the PIN protection from the folder for future access.

This list of menu options is illustrative and not meant to be exhaustive or exclusive. It is contemplated that other functions and options also may be applicable. FIG. 6c depicts a user interface 640 illustrating authenticated user access to a private folder and the options available to that user. The user interface screen lists the folder's title 641, the content 643 stored in that folder, and the menus options 645 available to the user. The available menu options are discussed below.

In step 505, the user selects the desired menu option from those presented by the folder/bookmark manager 209c. The user makes his or her menu choice via the control device 217 or other equivalent peripheral device coupled or associated with the STB. The STB and/or folder/bookmark manager 209c will then carry out the function.

Figure 7:
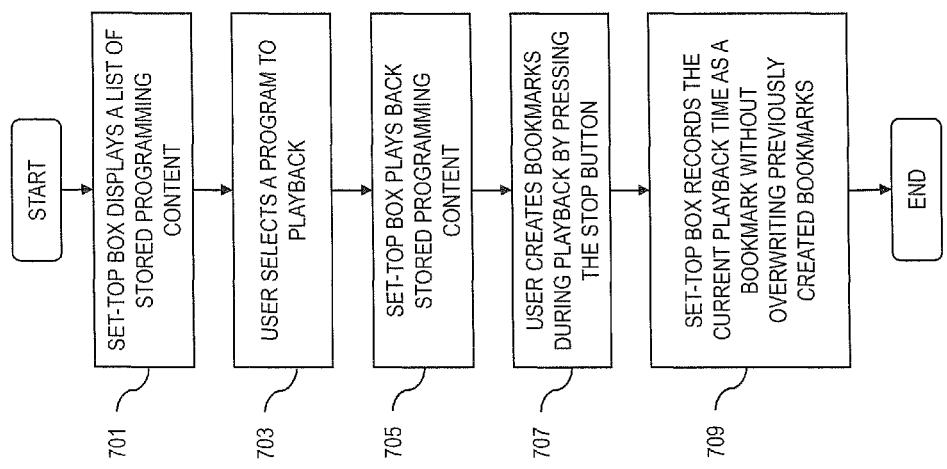
FIG. 7 is a flowchart of a process for creating bookmarks for playback of set-top box content, according to an exemplary embodiment.

FIG. 7 is a flowchart of a process for creating bookmarks for playback of set-top box content, according to an exemplary embodiment. Conventionally, play back of content resumes from the point the user stopped the content if the video has not reach the end of the stream. Moreover, traditionally, a bookmark of the only the last stopped position is stored. That is, the STB stores only one bookmark at a time for each program making the STB unable to store multiple bookmarks or bookmarks for multiple viewers of the same programming content.

The process of FIG. 7 overcomes this limitation by enabling a user to create multiple bookmarks for each programming content and multiple users to create bookmarks for the same programming content without interfering or erasing bookmarks created by other users. In step 701, the folder/bookmark manager 209c displays a list of programming content available for playback by the user. As discussed earlier this content can include any AV media (e.g., gaming applications, broadcast television programs, video-on-demand (VOD) programs, audio-on-demand (AOD) programs, pay-per-view programs, IPTV feeds, DVD related content, etc.), pre-recorded media content (e.g., DVR content), data communication services content (e.g., commercials, advertisements, videos, movies, songs, images, sounds, etc.), Internet services content (streamed audio, video, or pictographic media), and/or any other equivalent media form, such as locally stored content instances of the aforementioned media. The user selects the desired programming content to play back per step 703, and the STB initiates playback of the content per step 705.

During playback, the folder/bookmark manager 209c monitors user input to determine when the user wants to create a bookmark. In the exemplary embodiment, the user creates a bookmark by pressing the "STOP" button via control device 217 or equivalent peripheral device per step 707. It is recognized that any other suitable actuator of these devices may be additionally, or alternatively, used to access the bookmarking function. In step 709, when the STB 201 detects that the user has pressed the appropriate button to create a bookmark, the folder/bookmark manager 209c will record the current playback time of the program and create a bookmark at that time. The folder/bookmark manager 209c adds to, but does not overwrite, any previously created bookmarks. Under this embodiment, a user may create any number of bookmarks for a program. Multiple users also can create bookmarks without interfering with previously created bookmarks because the folder/bookmark manager 209c does not overwrite older bookmarks.

Figure 8:
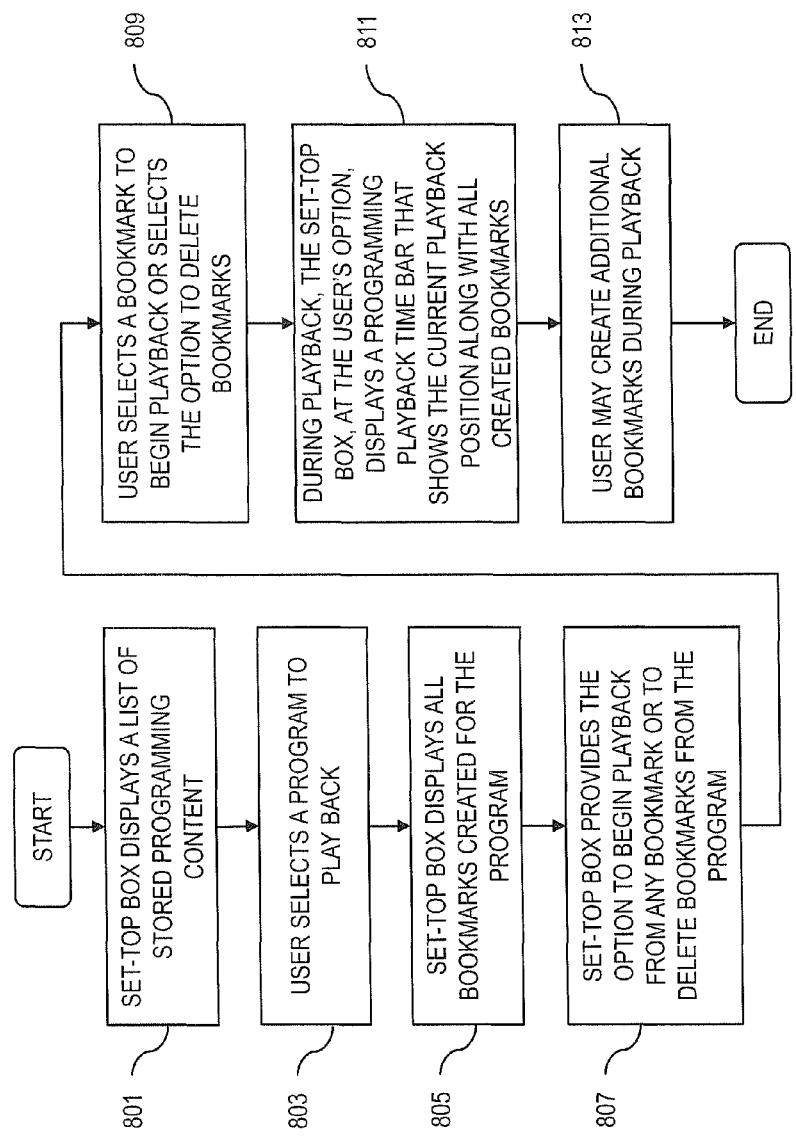
FIG. 8 is a flowchart of a process for using and deleting bookmarks for playback of set-top box content, according to an exemplary embodiment.

FIG. 8 is a flowchart of a process for using and deleting bookmarks for playback of set-top box content, according to an exemplary embodiment. This process is described with respect to the exemplary user interface of FIG. 9. The process of using and deleting bookmarks is very similar to the process for creating bookmarks described above. In step 801, the folder/bookmark manager 209c displays a list of programming content available for playback by the user. In step 803, the user selects the desired programming content to play back. The STB 201 then displays playback options for the program including listing all available bookmarks created for the program per step 805. In the exemplary embodiment, the folder/bookmark manager 209c presents the user with options to "DELETE," "PLAY," "PLAY FROM START," or "PLAY FROM HH:MM:SS" for each available bookmark where "HH:MM:SS" represents the hour, minute, and second respectively of the bookmarked position. It is contemplated that the STB 201 also may represent bookmarks using thumbnails of the programming content or by user-assigned labels. The playback options available to the user are briefly discussed as follows. "DELETE" will delete the program; "PLAY" will play the program from the last recorded bookmark; "PLAY FROM START" will play the program for the beginning; and "PLAY FROM HH:MM:SS" will play the program from the bookmarked position.

In step 807, the folder/bookmark manager 209c enables the user to begin playback from or delete any previously created bookmark. When the user selects a bookmark, the folder/bookmark manager 209c will present the user the options to play from the bookmarked position, to delete the selected bookmark, or to delete all bookmarks. The user makes his or her selection via control device 217 or equivalent peripheral device per step 809. If the user selects to delete one or all bookmarks, the folder/bookmark manager 209c will carry out the function. If the user selects to play back the program from a bookmarked position, the folder/bookmark manager 209c will begin playback of the program from the desired bookmark.

During playback, the user may access the programming playback time bar display to view previously created bookmarks and the current playback position per step 811. The user accesses the time bar by pressing "DISPLAY" on the control device 217 or equivalent peripheral device.

Figure 9:
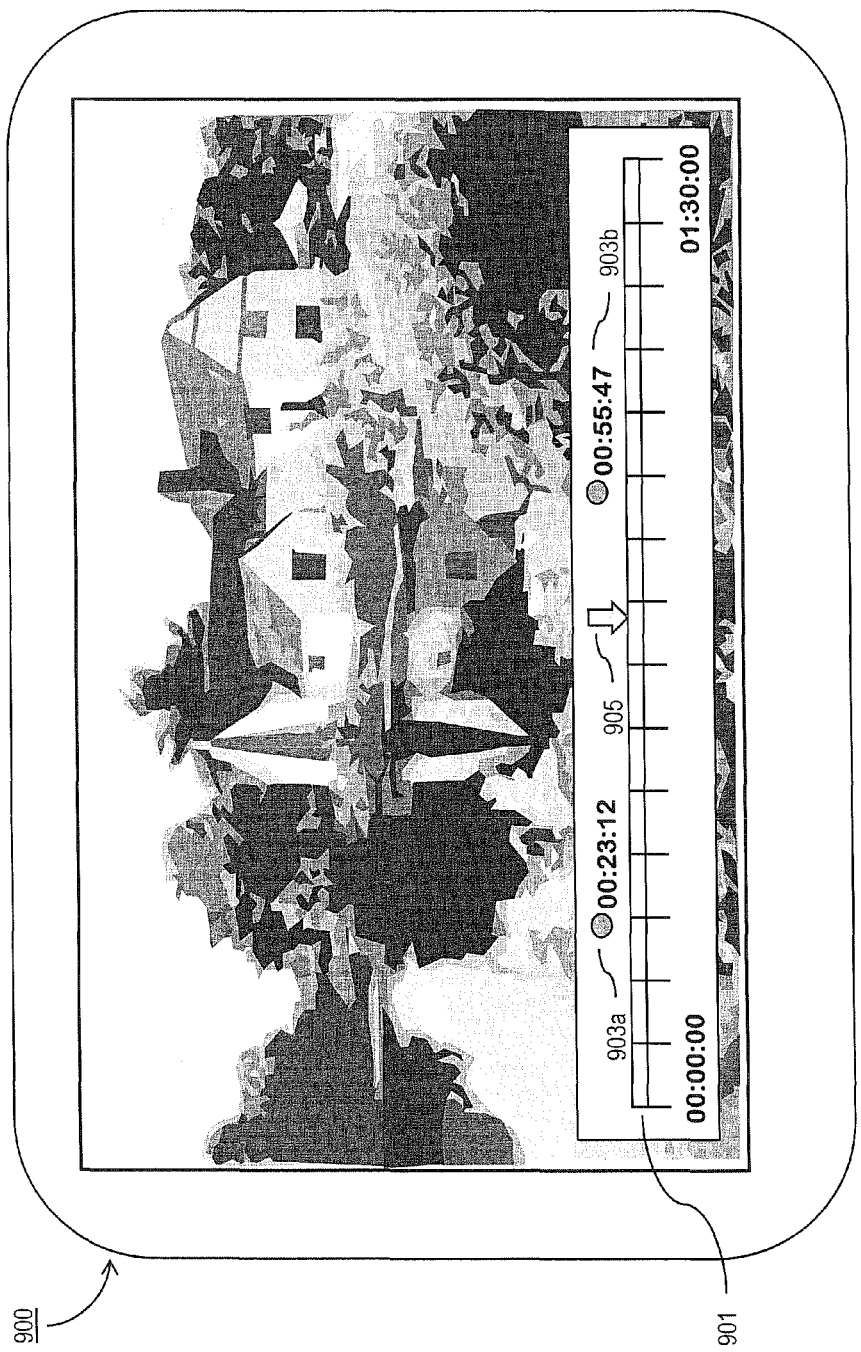
FIG. 9 is diagram of a user interface utilized in the processes of FIG. 8, according to an exemplary embodiment.

FIG. 9 depicts user interface 900 illustrating program playback overlaid with the programming playback time bar 901. Above the time bar, bookmarked positions 903a-903b are indicated by a bullet followed by a time. The current playback position is represented by a marker 905. Per step 813, the user can create additional bookmarks during playback using the process described with respect to FIG. 7.

The processes described herein for organizing content into folders and bookmarking such content may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
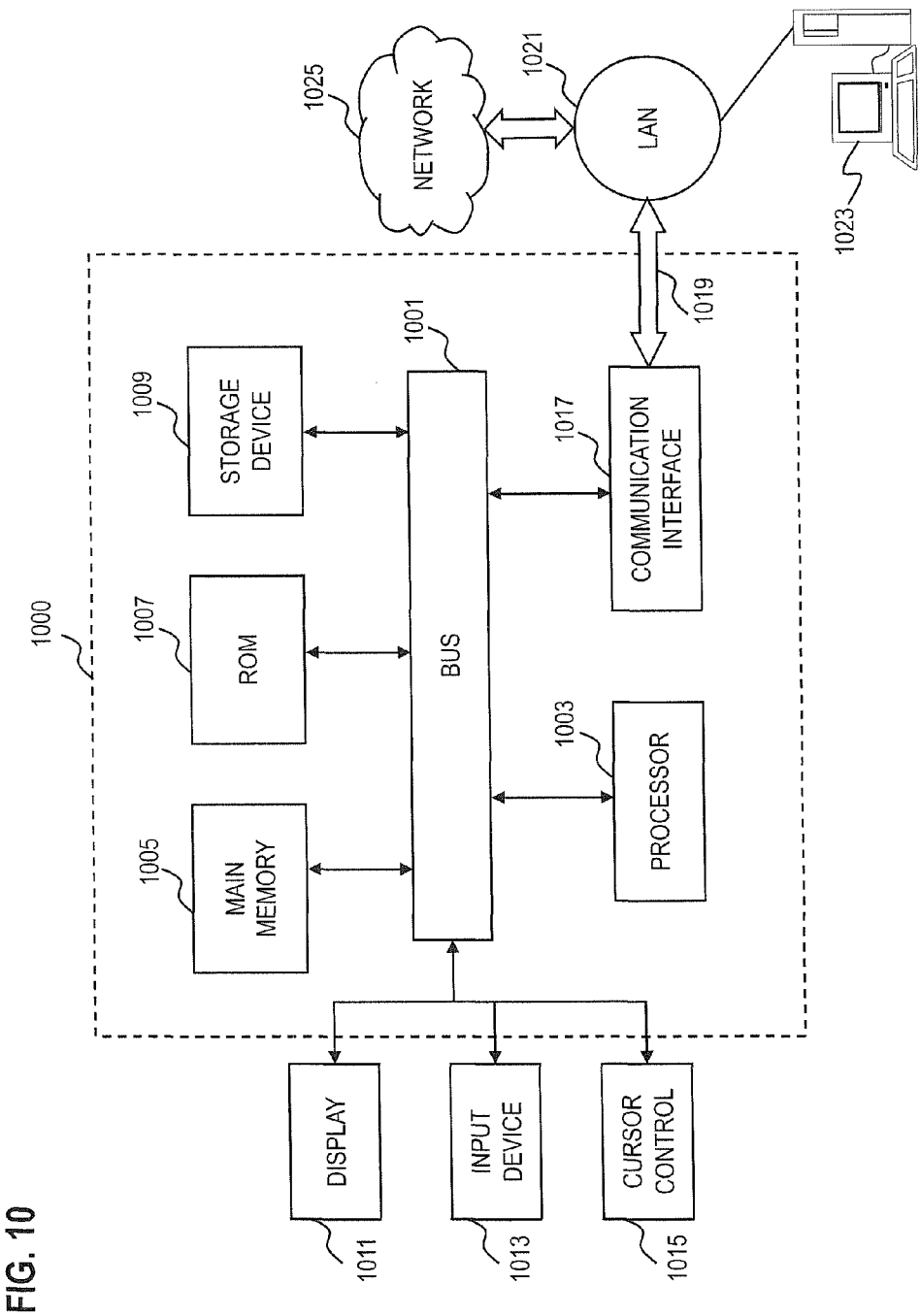
FIG. 10 is a diagram of a computer system that can be used to implement various exemplary embodiments.

FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the preferred embodiments have been described herein, alterations thereto, and other embodiments and implementations of the invention as set forth in the attached claims are possible. Accordingly, the scope of the invention is not limited to the description provided herein, but rather covers various modifications and equivalent an arrangements.

What is claimed is:

1. A method comprising:
    receiving a first input from a user at a set-top box to stop playback of a discrete content program playing through the set-top box at a first stop point;
    creating, in response to the first input, a first bookmark for playback of the discrete content program starting at the first stop point;
    receiving, subsequent to the receiving of the first input and the creating of the first bookmark, a second input from the user at the set-top box to stop playback of the discrete content program playing through the set-top box at a second stop point different from the first stop point;
    creating, in response to the second input, a second bookmark for playback of the discrete content program starting at the second stop point, without overwriting the first bookmark;
    creating, based on another input from the user at the set-top box, a user-defined folder to organize content accessible through the set-top box, including the discrete content program;
    saving information associated with the first bookmark and the second bookmark in the user-defined folder, including data representative of the first stop point and the second stop point; and limiting access to the information saved in the user-defined folder by requiring satisfaction of an identity challenge to access the information saved in the user-defined folder;

displaying, subsequent to the creating of the first bookmark and the creating of the second bookmark, a list of programming content available for playback to the user, the list of programming content including the discrete content program;

detecting, from the list of programming content available for playback to the user, a user selection of the discrete content program;

displaying, in response to the detecting of the user selection of the discrete content program, a menu of playback options for the discrete content program, the menu of playback options for the discrete content program including an option selectable by the user to cause the set-top box to play the discrete content program starting at the beginning of the discrete content program, an option selectable by the user to cause the set-top box to play the discrete content program starting at the first stop point corresponding to the first bookmark, and an option selectable by the user to cause the set-top box to play the discrete content program starting at the second stop point corresponding to the second bookmark;

detecting a user selection of the option selectable by the user to cause the set-top box to play the discrete content program starting at the first stop point corresponding to the first bookmark; and playing back the discrete content program starting at the first stop point in response to the user selection of the option selectable by the user to cause the set-top box to play the discrete content program starting at the first stop point.

2. A method according to claim 1, further comprising:
displaying during the playing back of the discrete content program in response to the user selection of the option selectable by the user to cause the set-top box to play the discrete content program starting at the first stop point corresponding to the first bookmark playback of the discrete content program overlaid with a programming playback time bar, a marker that represents a current playback position along the programming playback time bar, and indicators for the first bookmark and the second bookmark positioned at the first stop point and the second stop point, respectively, along the programming playback time bar.

3. A method according to claim 2, wherein the indicators for the first bookmark and the second bookmark comprise:
a first visual indicator and a first textually-represented time for the first bookmark both positioned at the first stop point along the programming playback time bar; and
a second visual indicator and a second textually-represented time for the second bookmark both positioned at the second stop point along the programming playback time bar.

4. A method according to claim 1, wherein the requiring satisfaction of the identity challenge comprises prompting for and receiving a passcode that matches a passcode associated with the user-defined folder.

5. A method according to claim 1, further comprising:
moving the content from the user-defined folder to another user-defined folder, the user-defined folder and the other user-defined folder being associated with different users; and
saving information associated with the first stop point and the second stop point in the user-defined folder and the other user-defined folder, respectively.

6. A method according to claim 1, further comprising:
designating the user-defined folder as either public or private, wherein the designation is differentiated based on a visual indicator.

7. A method according to claim 1, wherein the content includes broadcast content, digital video recorder (DVR) content, on-demand video, on-demand games, locally stored content, content stored on a network, or a combination thereof.

8. A method according to claim 1, further comprising:
renaming the content in the user-defined folder.

9. A method according to claim 1, the menu of playback options for the discrete content program further including an option selectable by the user to cause the set-top box to play the discrete content program starting at a point corresponding to a last recorded bookmark for the discrete content program.

10. A method according to claim 1, wherein the menu of playback options for the discrete content program is displayed to the user and includes user-selectable bookmark options only for bookmarks created based on input received from the user.

11. An apparatus comprising:
an input interface configured to:
receive a first input from a user at a set-top box to stop playback of a discrete content program playing through the set-top box at a first stop point;
receive a second input from the user at the set-top box to stop playback of the discrete content program playing through the set-top box at a second stop point different from the first stop point; and
receive another input from the user at the set-top box to create a user-defined folder
a processor configured to:
create, in response to the first input, a first bookmark for playback of the discrete content program starting at the first stop point;
create, in response to the second input, a second bookmark for playback of the discrete content program starting at the second stop point, without overwriting the first bookmark;
create, based on the another input from the user at the set-top box, the user-defined folder to organize content accessible through the set-top box, including the discrete content program;
save information associated with the first bookmark and the second bookmark in the user-defined folder, including data representative of the first stop point and the second stop point;
limit access to the information saved in the user-defined folder by requiring satisfaction of an identity challenge to access the information saved in the user-defined folder;
provide for display, subsequent to the creation of the first bookmark and the second bookmark, a list of programming content available for playback to the user, the list of programming content including the discrete content program;

detect, from the list of programming content available for playback to the user, a user selection of the discrete content program;

display, in response to the detection of the user selection of the discrete content program, a menu of playback options for the discrete content program, the menu of playback options for the discrete content program including an option selectable by the user to cause the set-top box to play the discrete content program starting at the beginning of the discrete content program, an option selectable by the user to cause the set-top box to play the discrete content program starting at the first stop point corresponding to the first bookmark, and an option selectable by the user to cause the set-top box to play the discrete content program starting at the second stop point corresponding to the second bookmark;

detect a user selection of the option selectable by the user to cause the set-top box to play the discrete content program starting at the first stop point corresponding to the first bookmark; and play back the discrete content program starting at the first stop point in response to the user selection of the option selectable by the user to cause the set-top box to play the discrete content program starting at the first stop point corresponding to the first bookmark.

12. An apparatus of claim 11, wherein the processor is further configured to:

provide for display, during the playing back of the discrete content program in response to the user selection of the option selectable by the user to cause the set-top box to play the discrete content program starting at the first stop point corresponding to the first bookmark, playback of the discrete content program overlaid with a programming playback time bar, a marker that represents a current playback position along the programming playback time bar, and indicators for the first bookmark and the second bookmark positioned at the first stop point and the second stop point, respectively, along the programming playback time bar.

13. An apparatus according to claim 11, wherein the processor is further configured to require satisfaction of the identity challenge by prompting for and receiving a passcode that matches a passcode associated with the user-defined folder.

14. An apparatus of claim 11, wherein the processor is further configured to move the content to or from the user-defined folder with respect to another user-defined folder.

15. An apparatus of claim 11, wherein the processor is further configured to designate the user-defined folder as either public or private, wherein the designation is differentiated based on a visual indicator.

16. An apparatus according to claim 11, wherein the content includes broadcast content, digital video recorder (DVR) content, on-demand video, on-demand games, locally stored content, content stored on a network, or a combination thereof.

17. An apparatus according to claim 11, wherein the processor is further configured to rename the content in the user-defined folder.

18. A method comprising:

receiving a first input from a user at a set-top box to stop playback of a discrete content program playing through the set-top box at a first stop point;

creating, in response to the first input and without receiving additional input from the user, a first bookmark for playback of the discrete content program starting at the first stop point;

receiving, subsequent to the receiving of the first input and the creating of the first bookmark, a second input from the user at the set-top box to stop playback of the discrete content program playing through the set-top box at a second stop point different from the first stop point;

creating, in response to the second input and without receiving additional input from the user, a second bookmark for playback of the discrete content program starting at the second stop point, without overwriting or deleting the first bookmark;

creating, based on another input from the user at the set-top box, a user-defined folder to organize content accessible through the set-top box, including the discrete content program;

saving information associated with the first bookmark and the second bookmark in the user-defined folder, including data representative of the first stop point and the second stop point;

limiting access to the information saved in the user-defined folder by requiring satisfaction of an identity challenge to access the information saved in the user-defined folder;

displaying, subsequent to the creating of the first bookmark and the creating of the second bookmark, a list of programming content available for playback to the user, the list of programming content including the discrete content program;

detecting, from the list of programming content available for playback to the user, a user selection of the discrete content program;

displaying, in response to the detecting of the user selection of the discrete content program, a menu of playback options for the discrete content program, the menu of playback options for the discrete content program including an option selectable by the user to cause the set-top box to play the discrete content program starting at the beginning of the discrete content program, an option selectable by the user to cause the set-top box to play the discrete content program starting at the first stop point corresponding to the first bookmark, and an option selectable by the user to cause the set-top box to play the discrete content program starting at the second stop point corresponding to the second bookmark;

detecting a user selection of the option selectable by the user to cause the set-top box to play the discrete content program starting at the second stop point corresponding to the second bookmark; and playing back the discrete content program starting at the second stop point in response to the user selection of the option selectable by the user to cause the set-top box to play the discrete content program starting at the second stop point corresponding to the second bookmark.

19. A method according to claim 18, further comprising:
deleting a previously created bookmark in response to an input from the user to delete the previously created bookmark.

20. A method according to claim 18, wherein the requiring satisfaction of the identity challenge comprises prompting for and receiving a passcode that matches a passcode associated with the user-defined folder.

21. An apparatus comprising:
an input interface configured to:
  receive a first input and a second input from a user at a set-top box to stop playback of a discrete content program playing through the set-top box at a first stop point and a second stop point, respectively, the second stop point different from the first stop point; and
  receive another input from the user at the set-top box to create a user-defined folder;
a processor configured to:
  create, in response to the first input and without receiving additional input from the user, a first bookmark for playback of the discrete content program starting at the first stop point,
  create, in response to the second input and without receiving additional input from the user, a second bookmark for playback of the discrete content program starting at the second stop point, without overwriting or deleting the first bookmark;
  create, based on the another input from the user at the set-top box, the user-defined folder to organize content accessible through the set-top box, including the discrete content program;
  save information associated with the first bookmark and the second bookmark in the user-defined folder, including data representative of the first stop point and the second stop point;
  limit access to the information saved in the user-defined folder by requiring satisfaction of an identity challenge to access the information saved in the user-defined folder;
  provide for display, subsequent to the creation of the first bookmark and the second bookmark, a list of programming content available for playback to the user, the list of programming content including the discrete content program;
  detect, from the list of programming content available for playback to the user, a user selection of the discrete content program;
  provide for display, in response to the detection of the user selection of the discrete content program, a menu of playback options for the discrete content program, the menu of playback options for the discrete content program including
    an option selectable by the user to cause the set-top box to play the discrete content program starting at the beginning of the discrete content program,
    an option selectable by the user to cause the set-top box to play the discrete content program starting at the first stop point corresponding to the first bookmark, and
    an option selectable by the user to cause the set-top box to play the discrete content program starting at the second stop point corresponding to the second bookmark;
  detect a user selection of the option selectable by the user to cause the set-top box to play the discrete content program starting at the second stop point corresponding to the second bookmark; and
  play back the discrete content program starting at the second stop point in response to the user selection of the option selectable by the user to cause the set-top box to play the discrete content program starting at the second stop point corresponding to the second bookmark.

22. An apparatus of claim 21, wherein the processor is further configured to delete previously created bookmarks in response to an input from the user to delete the previously created bookmarks.

23. An apparatus of claim 21, wherein the processor is further configured to require satisfaction of the identity challenge by prompting for and receiving a passcode that matches a passcode associated with the user-defined folder.

* * * * *